United States Patent [19]

Bartmann et al.

[11] Patent Number: 4,746,723

[45] Date of Patent: May 24, 1988

[54] PROCESS FOR THE PRODUCTION OF A POLYPHENYLENE ETHER PROTECTED FROM MOLECULAR WEIGHT DEGRADATION

[75] Inventors: Martin Bartmann, Recklinghausen; Klaus Burzin, Marl; Klaus Bevers, Reken, all of Fed. Rep. of Germany

[73] Assignee: Chemische Werk Hüls Aktiengesellschaft, Marl, Fed. Rep. of Germany

[21] Appl. No.: 733,634

[22] Filed: May 13, 1985

[30] Foreign Application Priority Data

May 25, 1984 [DE] Fed. Rep. of Germany ....... 3419601

[51] Int. Cl.$^4$ .............................................. C08G 65/38
[52] U.S. Cl. ..................... 528/212; 528/214; 528/217; 528/215
[58] Field of Search ................ 528/212, 214, 217, 215

[56] References Cited

U.S. PATENT DOCUMENTS 4,440,923  4/1984  Bartmann et al. ................. 528/212
4,463,164  7/1984  Dalton et al. ....................... 528/212
4,487,918 12/1984  Heitz et al. ......................... 528/212

*Primary Examiner*—Morton Foelak
*Assistant Examiner*—M. L. Moore
*Attorney, Agent, or Firm*—Oblon, Fisher, Spivak, McClelland & Maier

[57] ABSTRACT

A process for the production of a polyphenylene ether by quenching a transition metal catalyzed oxidative coupling reaction of a di-ortho-substituted phenol, and separation of the metal component. The process comprises:

(1) removing the oxygen required for the coupling reaction,
(2) contacting the reaction solution with hydrogen sulfide, a solution containing sulfide ions or a mixture thereof, and
(3) separating the resulting precipitate.

16 Claims, No Drawings

PROCESS FOR THE PRODUCTION OF A POLYPHENYLENE ETHER PROTECTED FROM MOLECULAR WEIGHT DEGRADATION

BACKGROUND OF THE INVENTION

1. Field of the Invention:

This invention relates to the production of polyphenylene ethers.

2. Description of the Prior Art

Polyphenylene ethers and processes for their production are known. Such processes are described, for example, in Buehler "Spezialplaste" (Special Plastics) (Akademierverlag, Berlin, 1978) and in U.S. Pat. Nos. 3,306,874 and 3,306,875.

In industry, processes in which di-ortho-substituted phenols are oxidatively coupled by transition metal-amine complexes in the presence of oxygen or gas mixtures containing oxygen are used. Three process steps are required for the production of the pulverent end product, namely, quenching the polycondensation, purification of the polymer and isolation of the polyphenylene ether (PPE).

Depending on the reaction conditions in each case, quenching the polycondensation can advantageously result either by inactivation of the catalyst, separation of the catalyst or separation of the polymer. In some cases, these measures cause a purification (although incomplete) of the polymer in addition to ending the polycondensation.

The most important quenching methods used in the prior art are:

1. addition of aqueous acids,
2. addition of alkalies,
3. addition of copper ion complexing agents, and
4. addition of polar solvents for separation of the polymer.

The addition of aqueous acid solutions is probably the most widely used process for quenching polycondensations. With this process, however, acid consumption is high and amine separation is unsatisfactory (cf DE-OS No. 22 46 552, page 4, lines 1 to 8). This process has been improved by operating with extraction equipment. For example by using a countercurrent of an aqueous acid stream and optionally a raised temperature (DE-OS No. 21 05 372), but the problem remains that the process requires considerable amounts of alkali metal hydroxides to recover the amines.

Abandoned DE-OS No. 22 46 552, discloses a process in which a PPE reaction formulation containing a copper amine catalyst and the polymer in an aromatic solvent is quenched with a $CO_2$/water mixture and then worked up. However, in this process also, the separation of the amine from the polymer is unsatisfactory.

DE-OS No. 15 70 683 describes the addition of a 50% sodium hydroxide solution to the PPE reaction formulation. This process has not gained general acceptance because it does not reliably stop the polymerization reaction (cf DE-OS No. 24 30 130).

It is known that with chelating agents a copper catalyst can be inactivated and separated (cf DE-PS No. 15 70 683, column 15, lines 3 to 5, and DE-OS No. 26 40 147). Additionally, experimental details concerning the use of chelating agents are disclosed in DE-OS No. 23 64 319. The essential drawback of all processes that work with chelating agents is degradation of the polymer. It has been established (cf DE-OS No. 27 54 887) that polyphenylene ethers are degraded faster the higher the temperature and the longer the time elapsing between quenching the reaction and isolation of the polymer. For example, the viscosity index, which is a measurement for the average molecular weight of the polymer units, usually decreases at a temperature of 50° C. by more than 0.1 dl/g, not infrequently even by 0.2 dl/g, per hour (DE-OS No. 27 54 887).

This degradation cannot be avoided even by the use of special chelating agents such as, e.g., the polyamines of the process of DE-OS No. 24 60 323.

It has been proposed to add to the polymer solutions, in addition to the chelating agent, other stabilizing agents, such as bivalent phenols and reducing agents (cf DE-OS No. 27 54 887 and DE-PS No. 26 16 746) or aromatic amines (cf DE-OS No. 27 55 937). However, this approach is not satisfactory since in some cases the additives are required in considerable concentrations, and the isolation of the polyphenylene ethers is made all the more difficult by these additional stabilizing agents.

The polycondensation of PPE can also be stopped and the polymer precipitated with the addition of alcohols, ketones or their aqueous solutions. These are generally referred to as "antisolvents" which retain the catalyst residues and diphenylquinone in solution. However, even a small amount of the catalyst remaining in the polymer product can have a negative effect on its color quality and catalyze its degradation (cf DE-OS No. 26 16 746).

It is common to all precipitation processes (cf, e.g., DE-OSS Nos. 12 65 410, 25 32 477, 25 32 478, 26 55 161 and 27 52 867) that considerable amounts of solvents must be used, worked up and redistilled. Therefore in practice it is preferred to obtain the polymers by a direct isolation process, for example, by steam separation, spray drying or hot water agglomeration. But with these processes the transition metal catalyst residues and other impurities must be previously separated as quantitatively as possible (cf DE-OS No. 24 60 323).

Finally, the PPE reaction can also be quenched by simultaneous treatment with a bivalent phenol or benzoquinone and a mild reducing agent such as, for example, $H_2S$ or hydrazine (cf DE-PS No. 24 30 130). It can be gathered from the specification of DE-PS No. 2430 130 that the resulting polymer is not subject to molecular weight degradation within a day's time. The reducing agent by itself exhibits no action. Thus, for example, the viscosity number drops within a day from 0.61 dl/g to 0.44 dl/g when quenching with a 30-fold molar excess of hydrazine (see table I, test 7). But if the process is followed in accordance with the disclosure, and bivalent phenols or benzoquinones which are only slightly microbially degradable are added, the molecular weight of the polymer product is stabilized. This is a disturbing factor (cf DE-OS No. 27 54 887).

Moreover, it is mentioned in DE-PS No. 15 70 683 that the PPE reaction can also be stopped by precipitating the copper catalyst as an insoluble compound which is filtered off before isolation of the product. With this information, one skilled in the art might think of precipitating copper salts by introducting $H_2S$. Actually, under the conditions of the oxidative coupling reaction, precipitation of the copper sulfide, which in itself is slightly soluble, does not occur. It is clear from tests run by the applicants (see comparison test A) that precipitation of the copper sulfide either does not occur at all or only to a slight extent. The reason for this absence of precipitation is not known.

The applicants know of no example in the literature in which a PPE polycondensation can be stopped merely by the addition of hydrogen sulfide.

There continues to exist a strong need for a process for the production of polyphenylene ethers, in which the oxidative coupling can be stopped by the addition of only one agent and at the same time protecting the resulting polymer from molecular weight degradation. Such process should further make it possible to largely free the polymer from catalyst residues and reaction by-products, and at the same time separate the catalyst in suitable form. In particular, the transition metal and quinone components in the polymer should be reduced to a value of under about 5 ppm and 20 ppm, respectively. Moreover, it is desired to obtain a polymer with perfect color quality and which can be subjected to a direct isolation process.

This invention is based on the discovery that under the conditions of oxidative coupling reactions of di-ortho-substituted phenols, hydrogen sulfide is suitable as a precipitation agent for the transition metals used as catalyst components. This process only requires that care be taken that no oxygen is present during the quenching operation.

SUMMARY OF THE INVENTION

Accordingly, it is one object of the present invention to provide a process for quenching a di-ortho-substituted phenol coupling reaction.

It is another object of the present invention to protect the polyphenylene ether polymer product from degradation.

It is is another object of this invention to free the polymer product from catalyst residues and reaction by-products.

It is another object of the present invention to separate the catalyst in suitable form.

It is another object of the present invention to provide a polymer product having excellent color qualities and which can be subjected to a direct isolation process.

It has now been found that these objects can be obtained and that a PPE polycondensation can be effectively quenched and a polymer of the required quality obtained, if, after the desired degree of polymerization has been reached, the PPE formulation, freed of oxygen to the extent possible, is mixed with $H_2S$ or a solution containing sulfide ions and the resulting precipitate then separated.

DESCRIPTION OF THE PREFERRED EMBODIMENTS

The present invention relates to a process for the production of polyphenylene ether protected from molecular weight degradation.

This process in which an oxidative coupling reaction of di-ortho-substituted phenols catalyzed by transition metals is quenched and the metal component is separated, is characterized by the following:

1. The oxygen required for the coupling reaction is essentially removed for the quenching operation.
2. The reaction solution is brought in contact with hydrogen sulfide, a solution containing sulfide ions or a mixture thereof; and
3. Separating the resulting precipitate.

Polymerization processes for the production of PPE have been described in the prior art. See, for example, German laid-open specification Nos. 32 24 691 and 32 24 692. Attention is called to these specifications and the literature cited therein in regard to experimental details.

In the present process either a 2,6-diphenylphenol or a 2,6-di-n-alkylphenol, whose alkyl radicals are $C_1$ to $C_6$ may be used as di-ortho-substituted phenols. 2,6-Dimethylphenol is preferred.

The catalyst used for the polycondensation is usually a complex of a transition metal such as copper, cobalt, manganese or nickel, and an organic compound capable of complexing, such as, for example, amines, especially ethanolamines, $\alpha,\omega$-hydroxyamines, Schiff bases, especially salicylaldehyde derivatives, and oximes. A copper (II) amine complex may be used as a catalyst. The amine component may be morpholine.

Such systems are described, for example, in DE-OSS Nos. 15 70 458 and 27 02 294, DE-PS No. 27 55 829 and BE-PS No. 831 664. Complexes of copper salts and aliphatic or heterocyclic amines, especially complexes of copper(II) salts and morpholine are preferred.

The reaction medium can be of very varied type (cf U.S. Pat. Nos. 3,306,874 and 3,306,875). A solvent mixture of an aromatic hydrocarbon with 6 to 8 carbon atoms and an aliphatic alcohol with 1 to 4 carbon atoms in respective proportion by volume of 92.5:7.5 to 50:50 is preferred. However, no polyphenylene ether is to precipitate during the oxidative coupling reaction. Solvent mixtures of methanol and toluene are especially preferred.

Reaching a specific degree of polymerization can be determined in various ways. For example, physical-chemical measuring methods, such as determination of viscosity, can be used to check the degree of polymerization. Alternatively a specific reaction time can simply be established empirically.

During the introduction of hydrogen sulfide or the addition of the solution containing sulfides, as little oxygen as possible should be present in the gas and liquid spaces of the reaction. This is advantageously achieved by driving out the oxygen or reaction gas containing oxygen still present in the reaction with an inert gas such as, for example, nitrogen or argon. However, the amount of oxygen needed for the reaction can also be so adjusted that when the desired degree of polymerization is reached practically the entire amount of oxygen is consumed.

The hydrogen sulfide can be brought into contact with the reaction solution in varied ways. For example, hydrogen sulfide may be used in gaseous form. In this case, the hydrogen sulfide can be diluted by addition of inert gases such as nitrogen, carbon dioxide, hydrogen, carbon monoxide, etc. The gas mixtures should contain at least 2% hydrogen sulfide.

The reaction solution may be brought into contact with hydrogen sulfide or a solution containing sulfide ions at a temperature of 20° to 100° C., preferably 40° to 70° C.

In a preferred embodiment of the process according to the invention the reaction solution at a temperature of from 40° to 70° C. is brought in contact with gas containing $H_2S$ in co-current or counter-current fashion. The precipitated metal sulfide is then separated in a solid-liquid separator and the resulting polyphenylene ether solution is washed with $H_2O$. Water may be used for washing the PPE solution in quantities so that the organic phase to $H_2O$ volume ratio is from 20:1 to 1:2, at a temperature of 20° to 150° C., preferably at 40° to 80° C. The washing process, of course, can also be performed under excess pressure. Additionally, the treatment of the polyphenylene ether solution with gas containing H$_2$S and washing with H$_2$O may also be performed in one step.

The hydrogen sulfide which is preferably used in aqueous solution form can also be brought into contact with the reaction formulation in varied ways. Solutions of soluble metal sulfides, especially solutions of alkali and alkaline-earth sulfides, can be used instead of hydrosulfuric acid solutions. These solutions should contain at least 0.1 mol of sulfide per liter of solution.

The sulfide source is used in such an amount that there are 1 to 20 mol, preferably 1 to 10 mol, and more preferably 2 to 5 mol, of sulfide per 1 mol of transition metal compound.

The reaction with the hydrogen sulfide or solution containing sulfide should be run in a temperature range between 20° and 100° C. For example, first the desired amount of solution containing sulfide is added to the reaction formulation, heated to a temperature between 40° and 70° C., the reaction mixture is kept at this temperature for 10 to 20 minutes, and then the precipitate formed is centrifuged out.

The resulting precipitate may be separated by being simply filtered off. But the separation can also be performed with a centrifuge, separator, decanter or other methods known in the art.

In batch production of polyphenylene ethers, the polycondensation is interrupted at the desired reaction time by driving out the reaction gas containing oxygen. The sulfide, for example hydrogen sulfide, is then added to the reaction mixture which is then brought to the desired temperature. The precipitate formed is removed, e.g., by centrifuging, after 1 to 30 minutes.

When a continuously operated oxidative coupling reaction is used if the oxygen content of the liquid phase can be reduced below $6\times10^{-3}$ mol/l by suitable dosing of the oxygen addition, the H$_2$S can be introduced in the discharge of the last reaction stage, preferably directly into a suitable mixed element. This solution is then brought to the desired temperature. The precipitate containing the metal component can be separated in a continuously operating apparatus, e.g., a separator or a solid-jacket decanter.

The particular advantage of this process is that the metal constituent of the catalyst is reduced in one step to a value under about 5 ppm, (assuming concentration values that generally are initially between 500 and 5000 ppm). In addition, the precipitating solid metal sulfide can easily be reconverted (e.g., by roasting and then dissolution in acid) to a usable catalyst, without the need of having to work up the aqueous stop solutions. Such solutions which are acidic, alkaline or contain chelating agents heretofore had to be treated in a separate stage for recovery of the metal. With the present invention, work-up which is necessary to recover the expensive chelating agents and to avoid ecological damages by waste waters containing metals is no longer needed. The heretofore necessary work-up procedure which was especially important with copper because of its high toxicity to microorganisms is now no longer needed.

In regard to the process according to the present invention, it is surprising that the quinone content of the polyphenylene ether solutions are clearly reduced and that no degradation of the molecular weight occurs in heating or longer storage of the solutions.

To obtain pure polyphenylene ethers, known precipitation processes based on the addition of greater amounts of a non-solvent for the polyphenylene ethers may be used. However, because of the extreme purity and stability of the polyphenylene ether solutions produced according to the invention, the known direct isolation processes, e.g., the so-called hot water agglomeration or spray drying are the work-up methods of choice. For special applications, e.g., production of mixtures of polyphenylene ethers and polystyrene, it is sufficient to concentrate the product solutions by evaporation and then to mix them with the polystyrene and optionally other additives such as processing agents, flame-proofing agents, stabilizers and pigments (cf German patent application No. P 33 37 629.8=O.Z. 3950).

The J value indicated in the examples gives the relative viscosity change of a 0.5% solution of the polymer in chloroform at 25° C. in comparison with the pure solution according to DIN 53 728.

Other features of the invention will become apparent in the course of the following description of exemplary embodiments which are given for illustration of the invention and are not intended to be limiting thereof.

EXAMPLE 1

Production of the catalyst:

1.95 g of CuCO$_3$.Cu(OH)$_2$ is dissolved in 5.7 g of hydrobromic acid (48%) and the resulting homogenous solution is added to 30 g of morpholine with stirring.

Production of poly(2,6-dimethyl-1,4-phenylene oxide):

The catalyst solution, produced above, is combined with a mixture of 1300 g of toluene and 207 g of methanol in a 3-liter stirred reaction kettle, 30 g of a 50% solution of 2,6-dimethylphenol (DMP) in toluene is added and the polycondensation is started with stirring (750 rpm) by introduction of an air stream of 200 l/h. The reaction temperature is kept constant at 30° C. After 10 minutes, another 270 g of toluene/DMP solution is added in a dropwise manner over a period of 30 minutes. Thirty minutes after the last phenol addition, the air stream is replaced by a nitrogen current of 100 l/h.

After a nitrogen flush of five minutes, H$_2$S (20 l/h) is introduced and the reaction mixture is heated to 45° C. After 20 minutes, feeding of the gas is stopped and the precipitated CuS is centrifuged off. Then the resulting polymer solution is stirred for 60 minutes at 60° C. with 425 ml H$_2$O. After phase separation, the polyphenylene ether is isolated by addition of 1500 ml of methanol.

1. J value (after separation of the CuS)=55 ml/g
2. J value (in end product)=55 ml/g
3. Copper content (in end product)= <2 ppm
4. Quinone content (UV absorption at 420 nm of a 1% solution after CuS separation)= <0.2 mg/l
5. Quinone content (in precipitated product)= <20 ppm
6. Morpholine content of organic phase (after H$_2$O washing)=0.1%

The aqueous phase contains 5 ppm of Cu.

The reaction mixture, after separation of the copper sulfide, is allowed to stand for 24 hours and then the polymer is isolated in the way indicated. A relative viscosity J value of 55 ml/g is obtained again.

EXAMPLE 2

This example is run as described in example 1, but the nitrogen flush is replaced by a 10-minute introduction of CO$_2$ (150 l/h).

Analysis values 1 to 5 same as in example 1.

6. Morpholine content of the organic phase=0.02%.

EXAMPLE 3

This example is run as descried in example 1 but the $H_2S$ treatment is performed at 35° C., a mixture of 1490 g of toluene and 166 g of methanol is used as solvent, and 170 g of 2,6-diethylphenol is used instead of DMP.

Analysis values 1 to 6 as in example 1.

EXAMPLE 4

1300 g of toluene, 200 g of methanol and 15 g of morpholine are put in the apparatus described in example 1 and then a solution of 0.6 g of $MnCl_2$ and 2.5 g of benzoinoxime in 10 ml of methanol is added with stirring (750 rpm). After addition of 6 g of 50% aqueous sodium hydroxide solution, air (200 l/h) is introduced and 300 g of a 50% solution of DMP in toluene is added in a dropwise manner over a period of 30 minutes. Thirty minutes after the last DMP addition, the air feed is interrupted and a nitrogen flush (100 l/h) is performed for 5 minutes. Then for 15 minutes a mixture of $CO_2$ (180 l/h) and $H_2S$ (20 l/h) is introduced and the same time the mixture is heated to 55° C. The flesh-colored MnS is then centrifuged off, and the manganese-free polymer solution is stirred with 400 ml of $H_2O$ at 80° C. for 60 minutes. After phase separation, the product is isolated by precipitation with 1500 g of methanol.

1. J value (after separation of the MnS)=57 ml/g
2. J value (in end product)=57 ml/g
3. Manganese content (in end product)= <5 ppm
4. Quinone content (UV absorption at 420 nm of a 1% solution after MnS separation)=1 mg/l
5. Quinone content (in end product)=50 ppm After separation of the manganese sulfide, the reaction mixture is allowed to stand for 24 hours and then the polymer is isolated in the way indicated. A relative viscosity J value of 57 mg/l is obtained again.

EXAMPLE A

This example is run as in example 1 but 30 minutes after ending the DMP addition the air feed is not stopped. Instead $H_2S$ (20 l/h) and air are introduced for 10 minutes. No CuS precipitates. Work-up as in Example 1.

1. J value=55 ml/g
2. J value=51 ml/g
3. Copper content=20 ppm
4. Quinone content=35 mg/l
5. Quinone content=200 ppm The aqueous phase contains 1600 ppm of Cu.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A process for the production of a polyphenylene ether by quenching a transition metal catalyzed oxidative coupling reaction of a di-ortho-substituted phenol, and separation of the metal component, said process comprising:
   1. removing the oxygen required for the coupling reaction,
   2. contacting the reaction solution with hydrogen sulfide, a solution containing sulfide ions or a mixture thereof, and
   3. separating the resulting precipitate.
2. The process of claim 1, wherein the oxygen is removed by driving off with an inert gas.
3. The process of claim 1, wherein the oxygen required for the coupling reaction is provided as a reaction gas mixture containing oxygen, said oxygen being removed by driving off with an inert gas.
4. The process of claim 2, wherein the inert gas comprises nitrogen, argon or a mixture thereof.
5. The process of claim 1, wherein the amount of oxygen required for the oxidative coupling reaction is adjusted so that, when the desired degree of polymerization is reached, practically the entire amount of oxygen is consumed.
6. The process of claim 1, wherein the reaction solution is brought in contact with hydrogen sulfide or a solution containing sulfide ions at a temperature of from 20° to 100° C.
7. The process of claim 6 wherein the temperature is from 40° to 70° C.
8. The process of claim 1, wherein the molar ratio between the sulfide used and transition metal is between 1:1 and 10:1.
9. The process of claim 8 wherein the molar ratio is between 2:1 and 5:1.
10. The process of claim 1, wherein a copper(II)amine complex is used as a catalyst.
11. The process of claim 10, wherein the amine component of the catalyst comprises morpholine.
12. The process of claim 1, wherein 2,6-dimethylphenol is used as the di-ortho-substituted phenol.
13. The process of claim 1, wherein a mixture of an aromatic hydrocarbon with from 6 to 8 carbon atoms and an aliphatic alcohol with from 1 to 4 carbon atoms in proportion by volume of from 92.5:7.5 to 50:50 is used as a solvent.
14. The process of claim 13, wherein a solvent mixture of methanol and toluene is used.
15. The process of claim 1, wherein the polyphenylene ether solution obtained after separation of the metal sulfide is washed with water at a temperature of from 20° to 150° C.
16. A polyphenylene ether produced by the process of claim 1.

* * * * *